United States Patent
Desselle et al.

(10) Patent No.: US 8,892,860 B2
(45) Date of Patent: Nov. 18, 2014

(54) CLEARING SECURE SYSTEM RESOURCES IN A COMPUTING DEVICE

(75) Inventors: Bernard D. Desselle, Spring, TX (US); Mark A. Piwonka, Tomball, TX (US); Jose A Sancho-Dominguez, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 690 days.

(21) Appl. No.: 13/120,653

(22) PCT Filed: Oct. 3, 2008

(86) PCT No.: PCT/US2008/078722
§ 371 (c)(1), (2), (4) Date: Mar. 23, 2011

(87) PCT Pub. No.: WO2010/039149
PCT Pub. Date: Apr. 8, 2010

(65) Prior Publication Data
US 2011/0179264 A1    Jul. 21, 2011

(51) Int. Cl.
*G06F 9/24* (2006.01)
*G06F 15/177* (2006.01)
*G06F 12/06* (2006.01)
*G06F 21/81* (2013.01)
*G06F 21/55* (2013.01)

(52) U.S. Cl.
CPC ............ *G06F 12/0646* (2013.01); *G06F 21/81* (2013.01); *G06F 2221/2143* (2013.01); *G06F 21/554* (2013.01); *Y10S 257/922* (2013.01)
USPC .............. 713/2; 713/1; 713/100; 257/922; 361/654

(58) Field of Classification Search
USPC ............... 713/1, 2, 100; 257/922; 261/654
See application file for complete search history.

(56) References Cited

U.S. PATENT DOCUMENTS

| | | | |
|---|---|---|---|
| 6,105,136 A * | 8/2000 | Cromer et al. | 726/34 |
| 6,754,784 B1 | 6/2004 | North | |
| 7,120,800 B2 | 10/2006 | Ginter et al. | |
| 7,249,381 B2 | 7/2007 | Telesco | |
| 2008/0235432 A1 | 9/2008 | Chen et al. | |

FOREIGN PATENT DOCUMENTS

| | | |
|---|---|---|
| TW | 538331 B | 6/2003 |
| TW | M325559 U | 1/2008 |

OTHER PUBLICATIONS

WIPO, International Search Report, dated Apr. 3 2009, PCT/US2008/078722, filed Oct. 3, 2008.
Office Action, Taiwan Appliction No. 98133147, May 23, 2014, pp. 1-5.

* cited by examiner

*Primary Examiner* — Michael J Brown (57) ABSTRACT

Systems and methods of clearing system resources are disclosed. One example method includes the step of detecting a failure to clear a secure portion of a system resource in a device. The method also includes the step of powering off the system resource for a period of power-off time that is sufficient to clear data from the system resource, where the power off is responsive to the failure detection. The method also includes the step of unlocking the secure portion of the system resource, where the unlock is responsive to the period of power-off time having elapsed.

13 Claims, 10 Drawing Sheets

CLEARING SECURE SYSTEM RESOURCES IN A COMPUTING DEVICE

BACKGROUND

"Secure" computing devices use various techniques to prevent unauthorized access to protected data or "secrets" stored on the platform (e.g., passwords, account numbers, identification numbers, authorization keys, etc.). One of these techniques involves locking of system resources, such as memory, if secrets were written to memory but not cleared before reset, then unlocking system resources and clearing the secrets at the next boot. However, this conventional technique can leave the platform in an unrecoverable state if the unlock/erase mechanism (software, hardware, or a combination thereof) is inconsistent or out-of-sync with respect to other mechanisms that are involved in the locking of the system resources. This unrecoverable state can occur, for example, if a change is made to the memory configuration (e.g., total memory size, size of memory blocks, eta).

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

The techniques disclosed herein insure that secrets are erased during a device boot process after unsuccessful attempts to clear and/or unlock system resources. When such unsuccessful attempts are detected, power is removed from at least some portions of memory long enough for data to decay. When that time has elapsed, system resources are unlocked and the device continues with the boot process.

Figure 1:
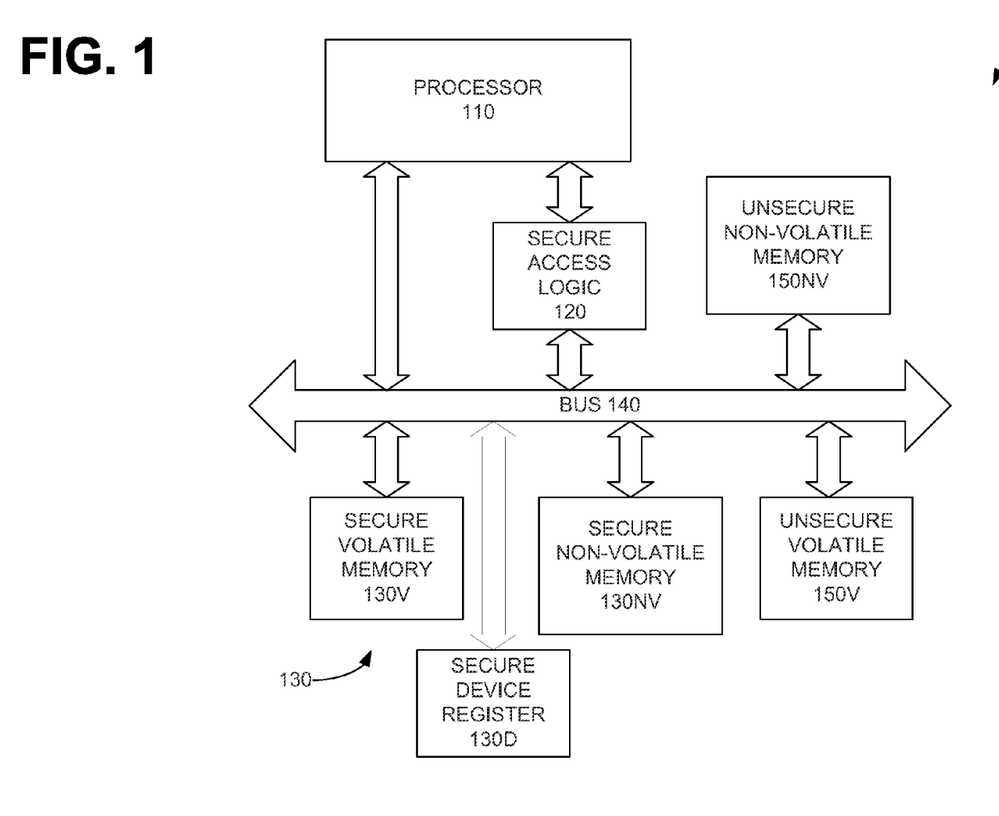
FIG. 1 is a block diagram showing selected components of a computing device in accordance with an embodiment of the invention as disclosed herein.

FIG. 1 is a block diagram showing selected components of a computing device 100 in accordance with an embodiment of the invention as disclosed herein. Computing device 100 may take the form of, for example, a desktop computer, a laptop computer, a personal digital assistant, a mobile phone, a videogame system, a portable media player, or any consumer electronics device. Computing device 100 includes a processor 110, secure access logic 120, and various secure system resources 130, in communication over a bus 140. Secure access logic 120 controls or restricts access to secure system resource 130, such that any access by processor 110 to a secure system resource 130 involves or invokes secure access logic 120. In some embodiments, the security setting of a particular resource is dynamically configurable. That is, a particular resource may be switched between a locked/secure state and an unlocked/unsecure state.

Secure system resource 130 may include (but are not limited to) memory such as secure volatile memory 130V and secure non-volatile memory 130NV. As should be known by persons of ordinary skill in the art, volatile memory requires continuous power to maintain stored information, where non-volatile memory does not. Examples of volatile memory include random access memory (RAM) (e.g., dynamic RAM, static RAM). Examples of non-volatile memory include non-volatile RAM, programmable read-only memory (ROM), and electrically erasable programmable read-only memory (EEPROM). Secure system resource 130 may also include peripheral device registers 130D (e.g., I/O-mapped, memory-mapped), peripheral device buffers (not shown), and registers within processor 110 (not shown). In this example embodiment, only a portion of the system resources is secure: computing device 100 also includes unsecure volatile memory 150M and unsecure non-volatile memory 150NV, access to which does not involve secure access logic 120. Other embodiments of computing device 100 include secure system resources 130 but not unsecure system resources 150.

Although secure access logic 120 is shown as a standalone block in FIG. 1, person of ordinary skill in the art should appreciate that secure access logic 120 may be implemented in various ways. For example, in some embodiments of computing device 100, secure access logic 120 is implemented by microcode within processor 110. In other embodiments, secure access logic 120 is implemented in hardware logic separate from processor 110. In some of these embodiments, secure access logic 120 may be part of the secure resource itself (e.g., part of a memory controller). In still other embodiments, the functionality of secure access logic 120 is distributed between the processor, standalone logic, and/or a memory controller.

In the course of executing software on processor 110, data is written to secure system resources 130. Such data is referred to as "secrets", and may include (but is not limited to) encryption keys, digital certificates, passwords, personal identifying information, financial information, etc. It is desirable to clear or "scrub" such secrets as part of the shutdown process and/or the boot process. However, if the scrubbing process is not successfully completed, then secrets remain and are vulnerable to snooping. The inventive techniques disclosed herein clear secrets by removing power to the system for a period of time that is long enough to discharge the contents of volatile secure system resources 130, a period known as decay time.

The decay time is based on physical and/or electrical characteristics of secure system resources 130 (e.g., type of memory) and of computing device 100 (e.g., power supply design, and bleed off circuitry). The decay time is generally in the range of seconds to minutes. The decay period of memory is also affected by temperature: generally, decay time increases as temperature decreases. Some embodiments include a thermal sensor and account temperature when determining the period of power removal.

This process of booting after the decay time has passed is implemented by logic to remove power for a decay period 200 and logic to boot after decay period 300. Logic 200 and logic 300 use unsecure non-volatile memory 150NV to save state between boots, using this state information to determine what actions to take from one boot to the next. In some embodiments, unsecure non-volatile memory 150NV is flash memory, but in other embodiments, unsecure non-volatile memory 150NV is contained within other components, for example, secure access logic 120 (FIG. 1) or I/O control logic such as I/O control hub 950 in FIG. 9B. The operation of logic to remove power for a decay period 200 will be explained in connection with the flowchart of FIG. 2 and the operation of logic to boot after decay period 300 will be explained in connection with the flowchart of FIG. 3.

Figure 2:
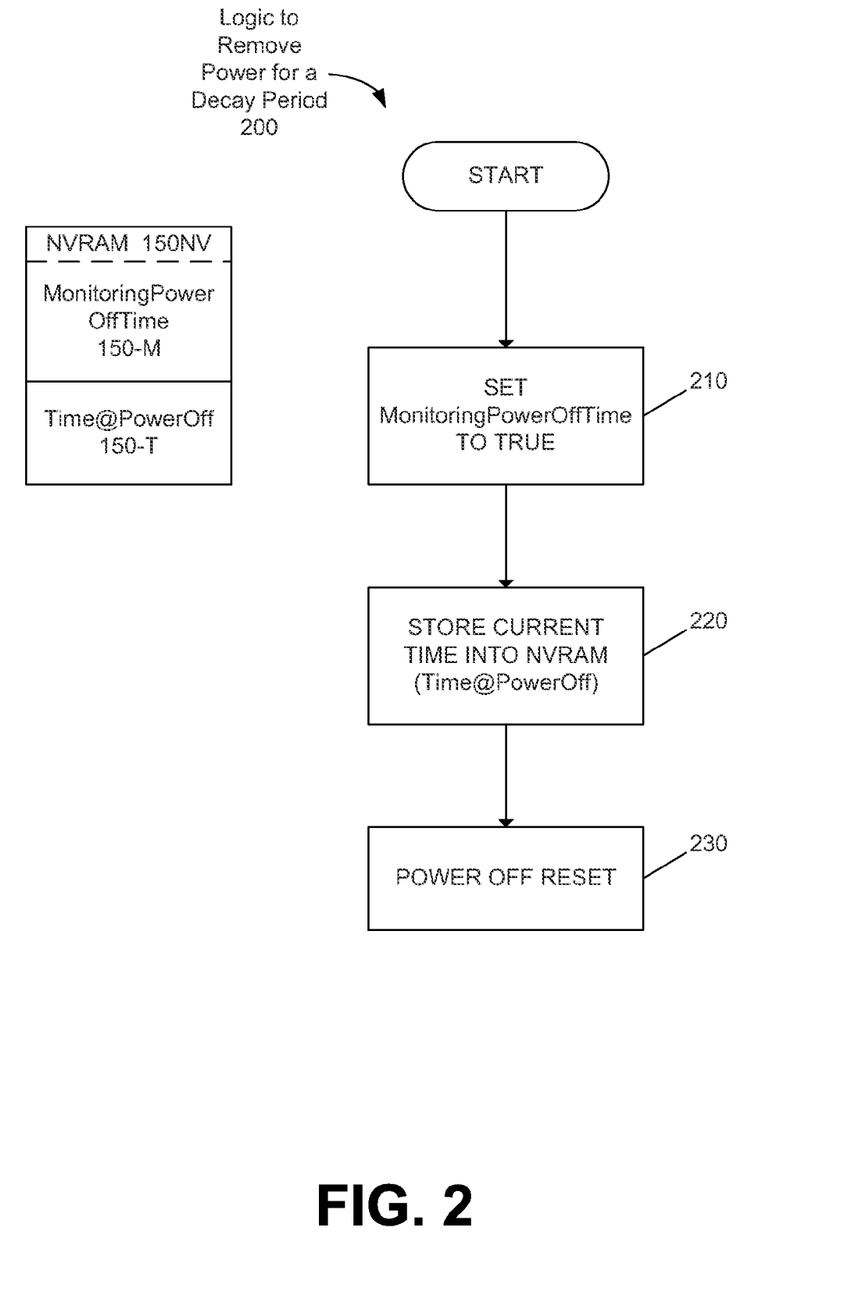
FIG. 2 is a flowchart illustrating operation of logic to remove power for a decay period, according to some embodiments disclosed herein.

FIG. 2 is a flowchart of the operation of logic to remove power for a decay period 200 according to some embodiments disclosed herein. Logic 200 starts at block 210, here a flag (MonitoringPowerOffTime 150-M) is set in unsecure non-volatile memory 150NV to indicate that the power-off time is being monitored. Next, at block 220 the current system time is stored in unsecure non-volatile memory 150NV (Time© PowerOff 150-T). In some embodiments, the current system time is obtained at block 220 by reading values from real-time clock (RTC) logic which is powered by a battery. However, other clocks or timers may be used, as long as the clock/timer measures elapsed time during the reset process, and as long as the period is long enough to measure the predetermined period necessary for secure system resources 130 to drain. After storing the current time, a power off reset, including removing power from and restoring power to computing device 100, is performed at block 230.

When power is restored, computing device 100 begins the boot process. The general principles of booting computing device 100 should be understood by a person of ordinary skill in the art, but an overview will be provided here. The boot process occurs in stages: firmware; boot loader; kernel, and operating system. Each of these stages prepares for the next stage: the firmware stage loads the boot loader into memory a transfers execution to the boot loader; the boot loader stage loads the kernel into memory and transfers execution to the kernel; the kernel, which is a small core of the operating system, loads the remainder of the operating system into memory.

Figure 3:
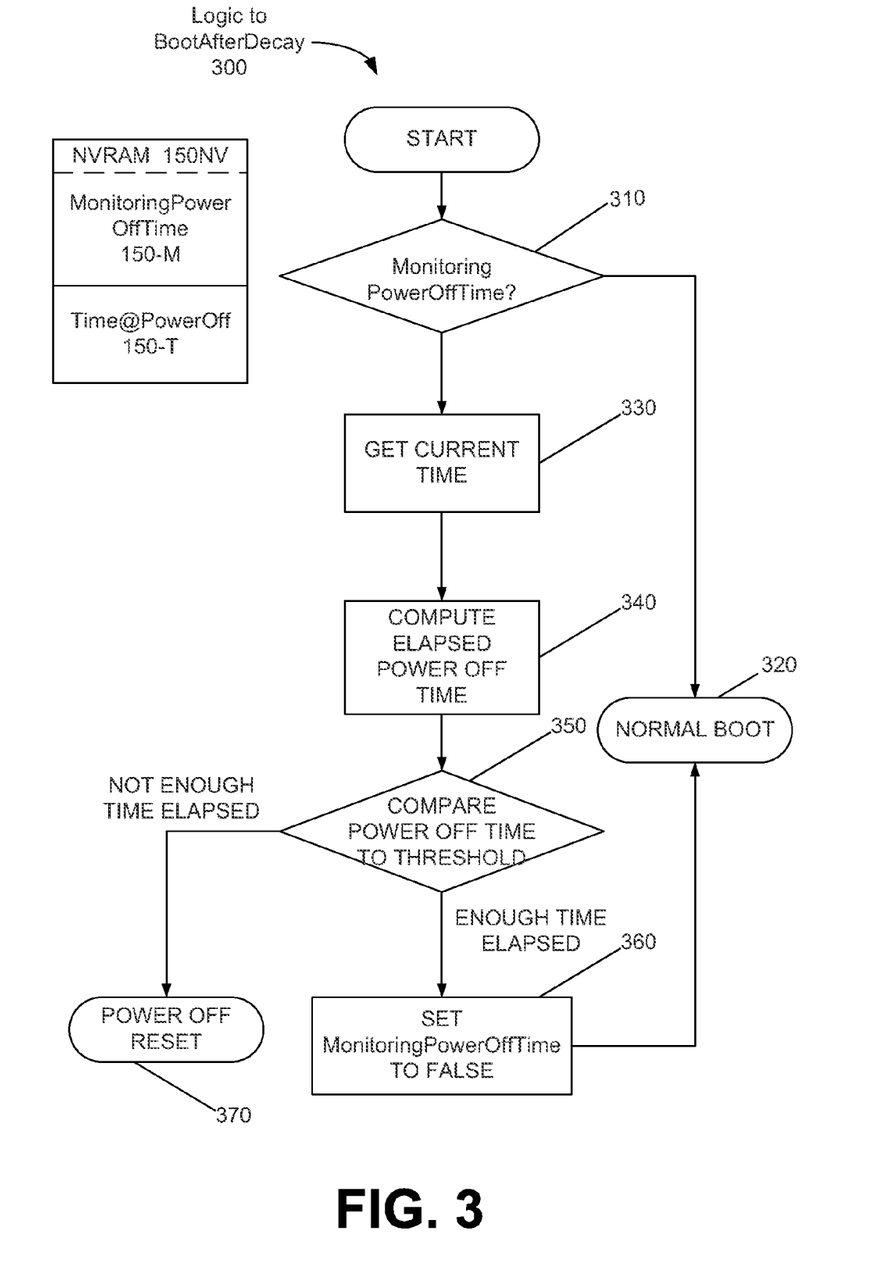
FIG. 3 is a flowchart illustrating operation of logic to boot after a decay period, according to some embodiments disclosed herein.

Although logic to boot after decay period 300 can execute at any time, it is desirable for logic to boot after decay period 300 to execute relatively early in the boot process, in order to minimize the software components that have access to secrets that were not cleared. Thus, some embodiments of logic 300 execute during the firmware boot stage. On a PC platform, the firmware boot stage is implemented by the Basic Input/Output System (BIOS). Thus, for some embodiments implemented on a PC platform, logic to boot after decay period 300 is implemented as part of the BIOS, which is stored in read-only memory (ROM) or in non-volatile memory such as flash memory. The BIOS boot stage will now be described in further detail, with a focus on how logic to boot after decay period 300 fits into the boot process.

On power up, processor 110 begins executing at a fixed location which is mapped to the start of the BIOS firmware code. The BIOS begins executing a number of tests known as Power On Self Test (POST). Some of these tests involve running firmware code that controls devices that are installed in the PC but are not part of the PC platform itself (e.g., video adapter, network adapter, etc.) This non-platform firmware is referred to as "option ROM" since these devices are optional, and the firmware is typically stored in ROM. To minimize the software components that have access to secrets that were not cleared, some embodiments of logic to boot after decay period 300 execute before any option ROMs execute. Then, after logic to boot after decay period 300 has run and the decay period has passed, the BIOS continues normal execution: calling option ROM code (if present); configuring motherboard or platform devices (e.g., Plug and Play, Legacy, and Peripheral Component Interconnect, etc.); locating the master boot record on the target boot drive; and transferring control to the boot loader location provided in the master boot record.

Having explained how logic to boot after decay period 300 fits into the boot process, operation of logic to boot after decay period 300 will now be described in connection with the flowchart of FIG. 3. Logic 300 begins at block 310, which checks to see if elapsed time since power off is being monitored. In the power off process that was described above in FIG. 2, a specific flag (MonitoringPowerOffTime 150-M) is set to indicate this condition, but a person of ordinary skill in the art should recognize that other technique may also be used (e.g., the presence of an initialized or non-zero value in Time© PowerOff 150-T). If elapsed time is not being monitored, then the normal boot sequence continues (320). Otherwise, if elapsed time is being monitored, then the current system time is obtained at block 330. At block 340, the elapsed time since power off is computed based on the current system time and the value stored by logic to remove power for a decay period 200 (Time© PowerOff 150-T). At block 350 this elapsed time is compared with a predetermined value that specifies an amount of time necessary for secure system resources 130 to drain.

If sufficient time has elapsed since the last power off for memory to decay, block 360 clears the variable indicating that elapsed time since power off is being monitored (e.g., MonitoringPowerOffTime 150-M), then the normal boot sequence continues at block 320. If insufficient time has elapsed, then power will be cycled at block 370, in order to remove power for long enough for memory to decay. After some period of time the BIOS, and logic to boot after decay period 300 contained within, executes again. At some point, the elapsed time since power off will exceed the predetermined threshold, and a normal boot sequence will complete (block 320).

Figure 4:
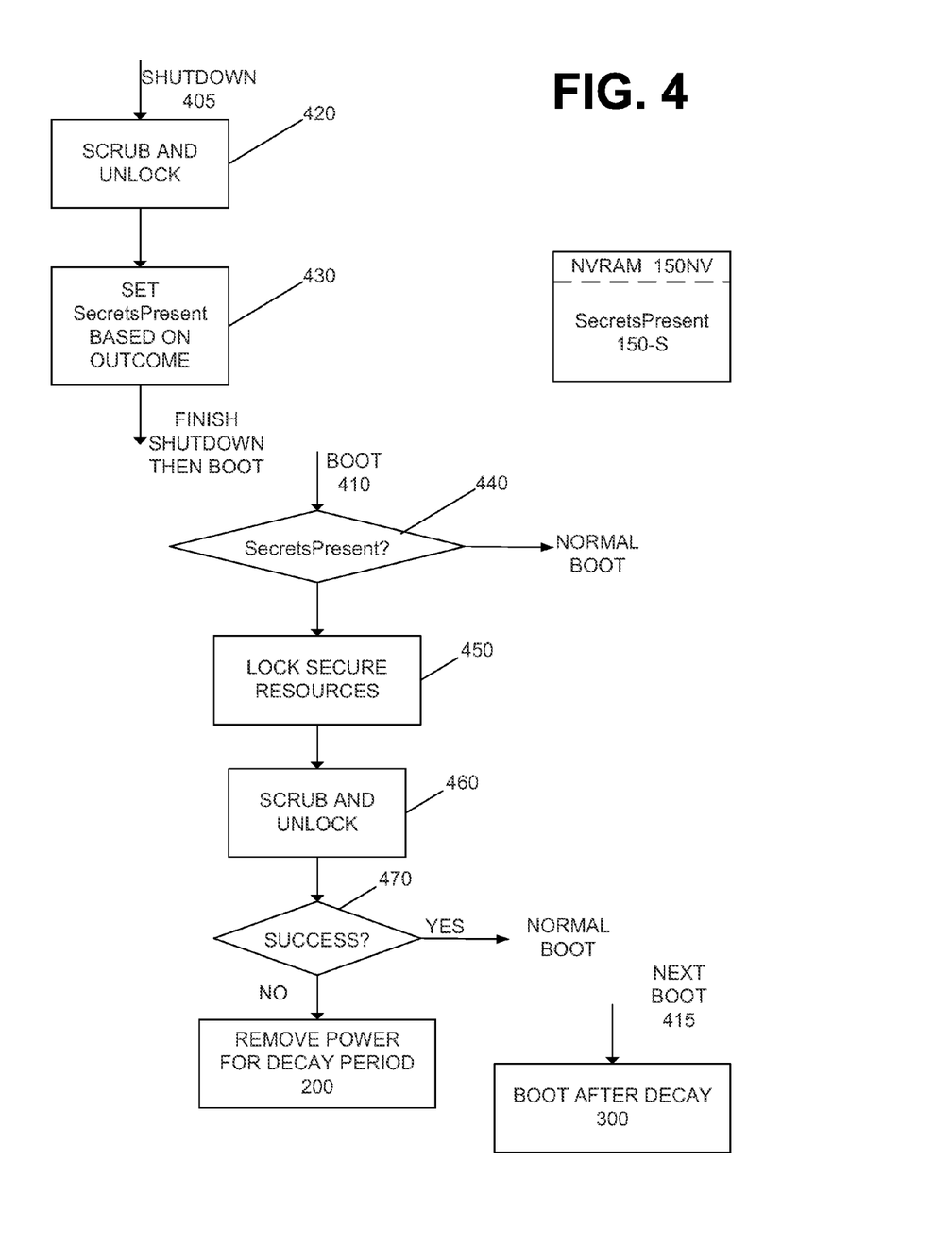
FIG. 4 is a flowchart of a process showing further details of how the logic to remove power for a decay period (from FIG. 2) and the logic to boot after decay period (from FIG. 3) are incorporated into the shutdown and boot process, according to some embodiments of the computing device of FIG. 1.

FIG. 4 is a flowchart of a process showing further details of how logic to remove power for a decay period 200 and logic to boot after decay period 300 are incorporated into the shutdown and boot process in some embodiments of computing device 100. FIG. 4 shows three different code paths: path 405 executes during an orderly system shutdown (e.g., system shutdown event, system reset event, request from the operating system, etc.); path 410 executes during the boot cycle after path 405; and path 415 executes during the boot cycle after path 410.

During the orderly system shutdown path 405, secure resources are scrubbed and unlocked at block 420. (This process will be discussed in further detail in connection with FIG. 5). Next, at block 430 the state variable SecretsPresent (150-S), stored in unsecure non-volatile memory 150NV, is cleared if this procedure was successful or set if unsuccessful.

Path 405 then continues to execute an orderly system shutdown, which ends with a reboot. In some embodiments, path 405 is also executed as a system trap handler, invoked when a software component attempts to perform a "warm" reboot (i.e., a reset without removing power), or when a software component attempts to enter a sleep state while secrets are present.

Path 410 then continues with this next boot cycle. Block 440 examines the state variable SecretsPresent 150-S to determine whether secrets are present. If secrets are not present, then normal boot processing occurs. However, if secrets are present then secure system resources 130 are locked at block 450 so that accesses to these resources goes through secure access logic 120. In other words, this lock procedure gives secure system resources 130 their "secure" behavior. In some embodiments which include a secure processor 110S (FIG. 9B), only trusted code can access locked or secure resources 130. After locking, block 460 scrubs and unlocks the secure system resources 130. (This process will be discussed in further detail in connection with FIG. 5). Next, block 470 determines whether the scrub was successful, and if so then normal boot processing occurs. If the scrub failed, then logic to remove power for a decay period 200 is executed (as described earlier in connection with FIG. 2).

When power is on again, path 415 then continues with another boot cycle. As explained earlier in connection with FIG. 3, logic to boot after decay period 300 will execute during this boot, and will continue cycling power until enough time has elapsed to discharge the contents of volatile secure system resources 130.

Figure 5:
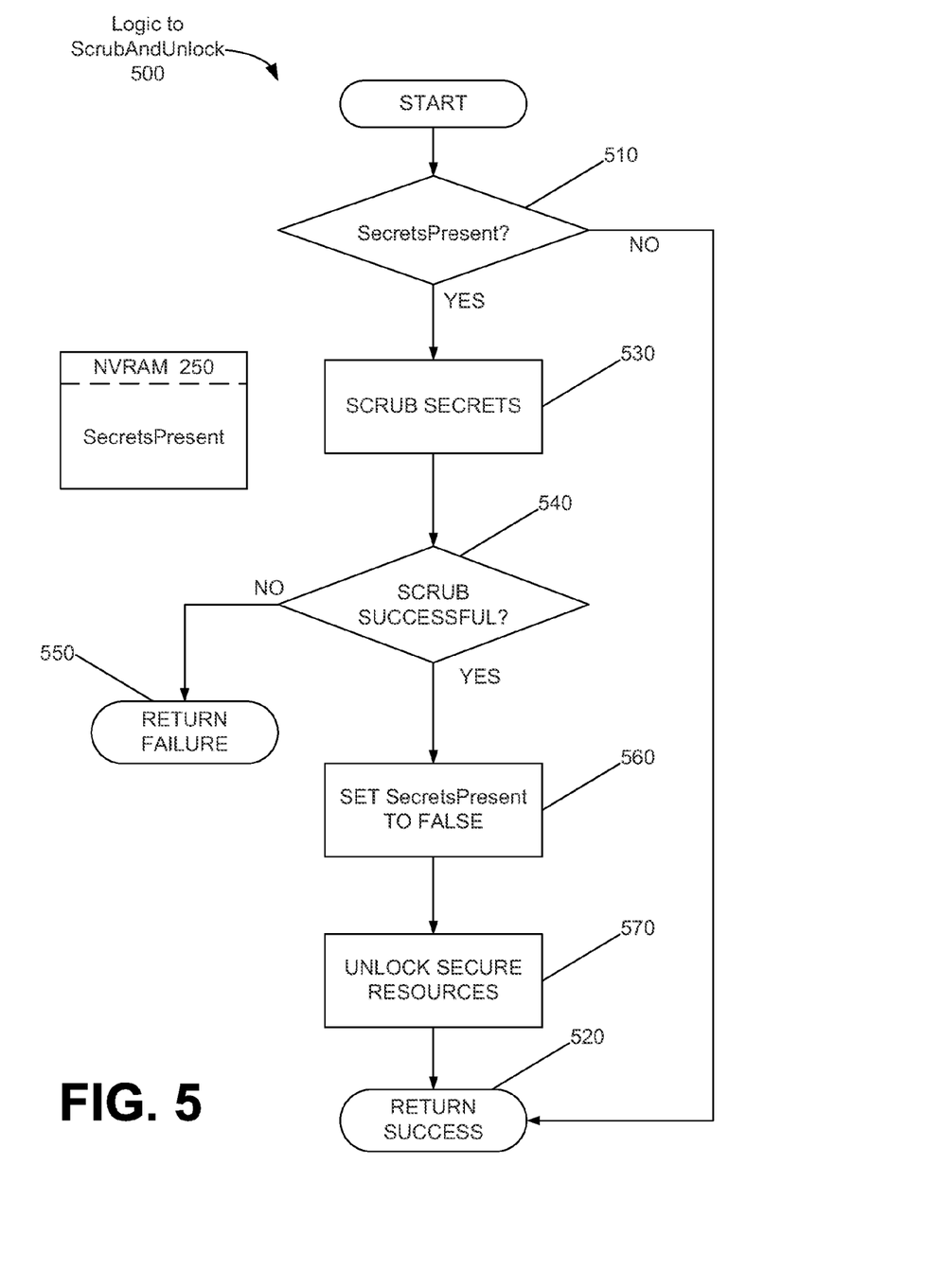
FIG. 5 is a flowchart of a scrub and unlock process, according to some embodiments of the computing device of FIG. 1.

FIG. 5 is a flowchart of the scrub and unlock process mentioned in connection with FIG. 4. The process 500 begins at block 510, where the state variable SecretsPresent 150-S is examined. In some embodiments, SecretsPresent 150-S represents whether a secure system resource 130 has been written to at all during this power on cycle. In other embodiments, SecretsPresent 150-S represents whether a secure system resource 130 has been written to but not cleared (e.g., by application or operating system components) during this power on cycle.

If no secrets are press: scrub is necessary and process 500 returns with a success code (block 520), If secrets are present, then block 530 clears, erases, or "scrubs" secure system resources 130. This scrubbing may utilize hardware logic, for example, secure access logic 120, or logic associated with a memory or I/O controller. Block 540 determines whether or not the scrub completed successfully. If not, process 500 returns with a failure code (block 550).

After completion of a successful scrub, the SecretsPresent 150-S state variable is cleared at block 560. At block 570, secure system resources 130 are unlocked. (Other portions of BIOS may lock the resources during later processing.) Process 500 then returns with a success code (block 520).

In some embodiments that include a secure processor 110S (FIG. 9B), the code represented by FIGS. 4 and 5 executes as trusted code which is allowed to access secure system resources 130, Trusted code is allowed to access secure system resources 130 because such code has been authenticated before execution. Trusted code typically includes basic input/output services (BIOS), a boot loader, and the operating system, kernel, or hypervisor. Untrusted code is not allowed to access secure system resources 130

Figure 6:
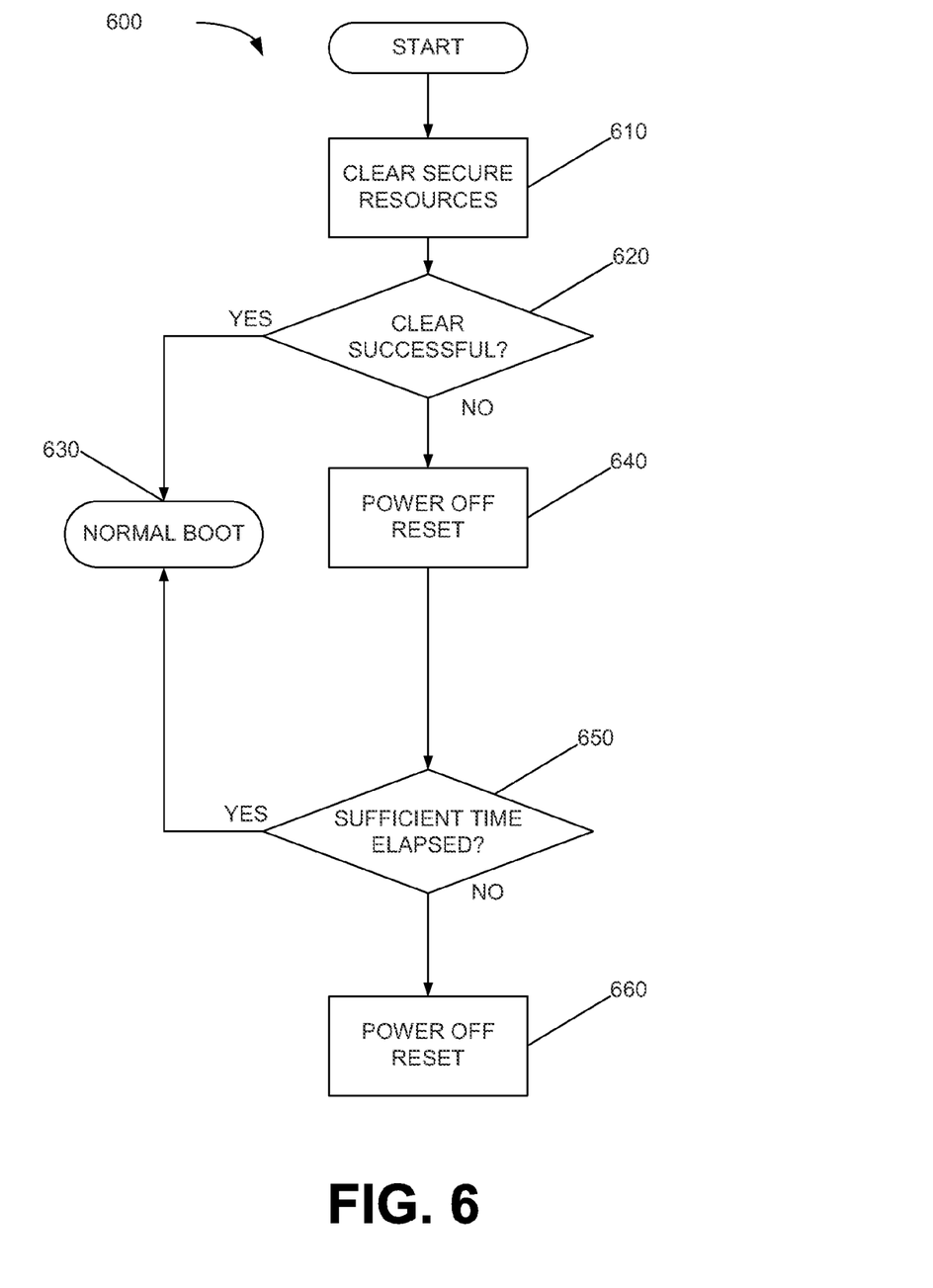
FIG. 6 is a flowchart of an embodiment combining the logic to remove power a decay period (from FIG. 2) and the logic to boot after decay period (from FIG. 3), according to some embodiments of the computing device of FIG. 1.

FIG. 6 is a flowchart of an embodiment which combines logic to remove power for a decay period 200 and logic to boot after decay period 300. The process 600 begins at block 610, which attempts to clear volatile secure system resources 130. Block 620 determines whether the clear was successful. If the clear was successful, process 600 continues with a normal boot sequence at block 630. If block 610 failed to clear secure system resources 130, then process 600 continues by performing a power off reset (block 640). Next, block 650 determines whether sufficient time has elapsed since the power off to discharge the contents of volatile secure system resources 130. If sufficient time has elapsed, process 600 continues with a normal boot sequence (block 630). If sufficient time has not elapsed, process 600 continues by performing another power off reset (block 660).

Figure 7:
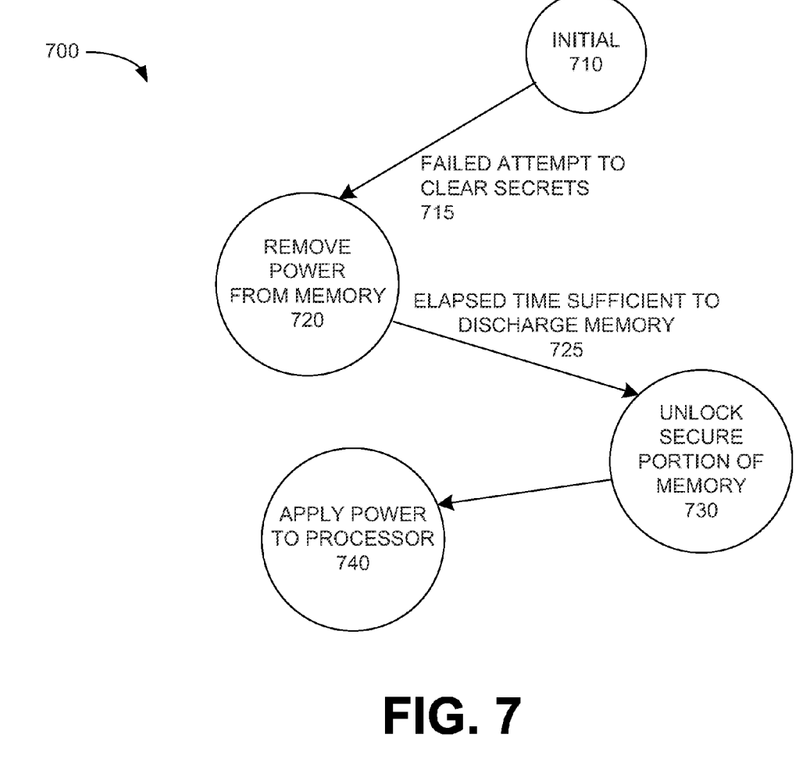
FIG. 7 is a state transition diagram illustrating another embodiment combining the logic to remove power for a decay period (from FIG. 2) and the logic to boot after decay period (from FIG. 3), according to some embodiments of the computing device of FIG. 1.

FIG. 7 is a state transition diagram illustrating another embodiment which combines logic to remove power for a decay period 200 and logic to boot after decay period 300. Persons of ordinary skill in the art should appreciate that this state transition diagram can be implemented in hardware logic, or as software executing on a processor which continues to draw power when the power to memory is cycled (e.g., a baseboard management controller). Logic to remove power and boot after decay 700 starts in initial state 710, and transitions to a second state 720 upon a failed attempt (715) to clear secure system resources 130. In second state 720, power is removed from at least secure system resources 130. When sufficient time has elapsed after the removal of power for the contents of secure system resources 130 to have discharged (725), logic 700 transitions to a third state 730, in which secure system resources 130 are unlocked. In some embodiments, a timer is started in second state 720 and third state 730 is entered when this timer expires. In some embodiments, state variable SecretsPresent 150-S is also cleared in third state 730. From third state 730, logic 700 transitions to a fourth state 740, and power is supplied to processor 110.

Figure 8:
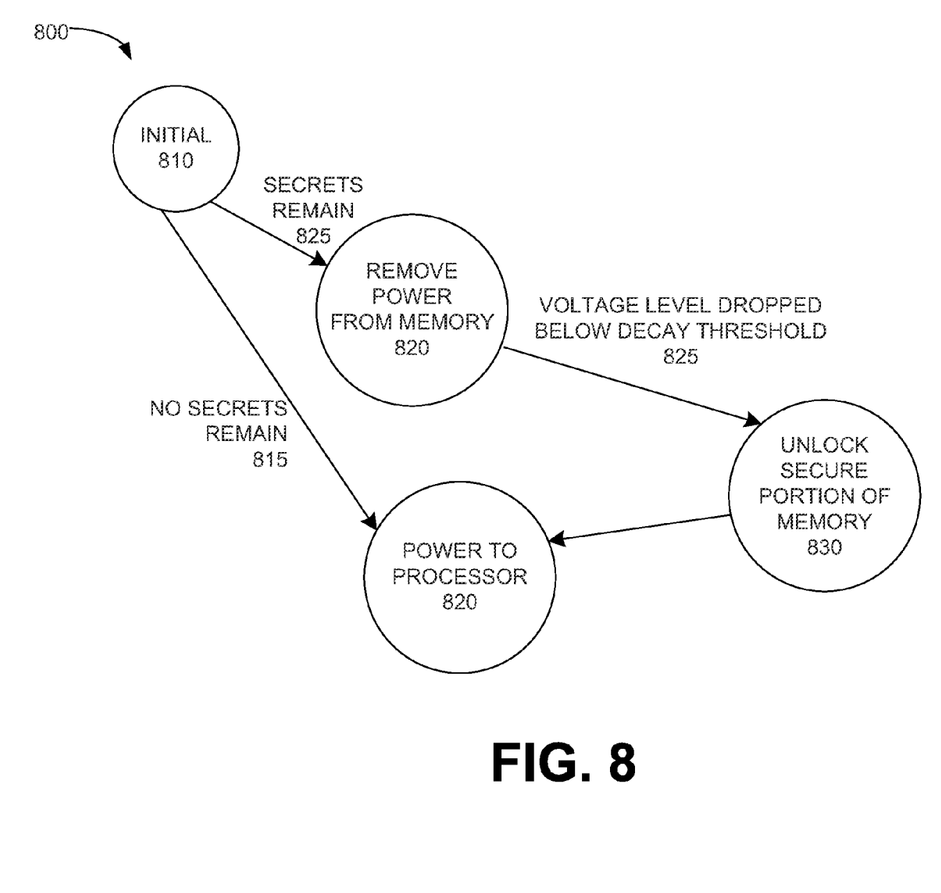
FIG. 8 is a state transition diagram illustrating another embodiment for booting after the decay period, according to some embodiments of the computing device of FIG. 1.

FIG. 8 is a state transition diagram illustrating an embodiment which removes power until voltage has dropped to a predefined level. Persons of ordinary skill in the art should appreciate that this state transition diagram can be implemented in hardware logic, or as software executing on a processor which continues to draw power when the power to memory is cycled (e.g., a baseboard management controller). Logic to boot after decay 800 starts in initial state 810 before power is applied to processor 110 and to secure system resources 130. Logic 800 determines whether secrets remain from the last boot (e.g., by checking a state variable such as SecretsPresent 150-S). If no secrets remain, logic 800 transitions (815) to a final state (820) where power is supplied to processor 110. If secrets do remain, logic 800 transitions to a second state. Logic 800 remains in this state until the voltage level supplied to secure system resources 130 drops below a decay threshold (825). Circuits to monitor this voltage level should be known to a person of ordinary skill in the art, as should techniques for determining the appropriate threshold.

When the voltage has dropped below the threshold (825), logic 700 transitions to a third state 830, in which secure system resources 130 are unlocked. In some embodiments, state variable SecretsPresent 150-S is also cleared in third state 830. From third state 830, logic 700 transitions to a fourth state 840, and power is supplied to processor 110.

Figure 9A:
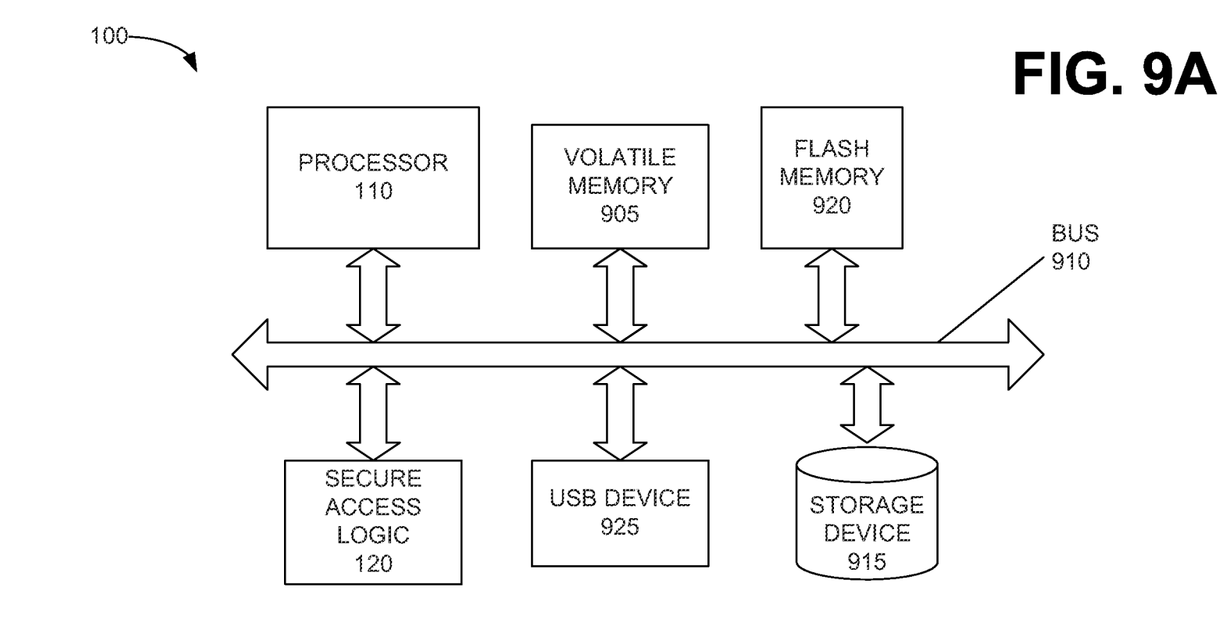
FIG. 9A is a block diagram showing further details of the computing device from FIG. 1, in accordance with some embodiments of the invention as disclosed herein.

FIG. 9A is a block diagram showing further details of computing device 100 (from FIG. 1) in accordance with an embodiment of the invention as disclosed herein. Computing device 100 includes processor 110 which communicates with volatile system memory 905 and various peripherals over a bus 910. In the example shown in FIG. 9, these peripherals include a storage device 915, non-volatile (e.g., flash) memory 920, and a universal serial bus (USB) device 925, but other peripherals are also within the scope of this disclosure. System memory 905 includes secure memory and unsecure memory (if present). Computing device 100 also includes secure access logic 120, described above in connection with FIG. 1.

Figure 9B:
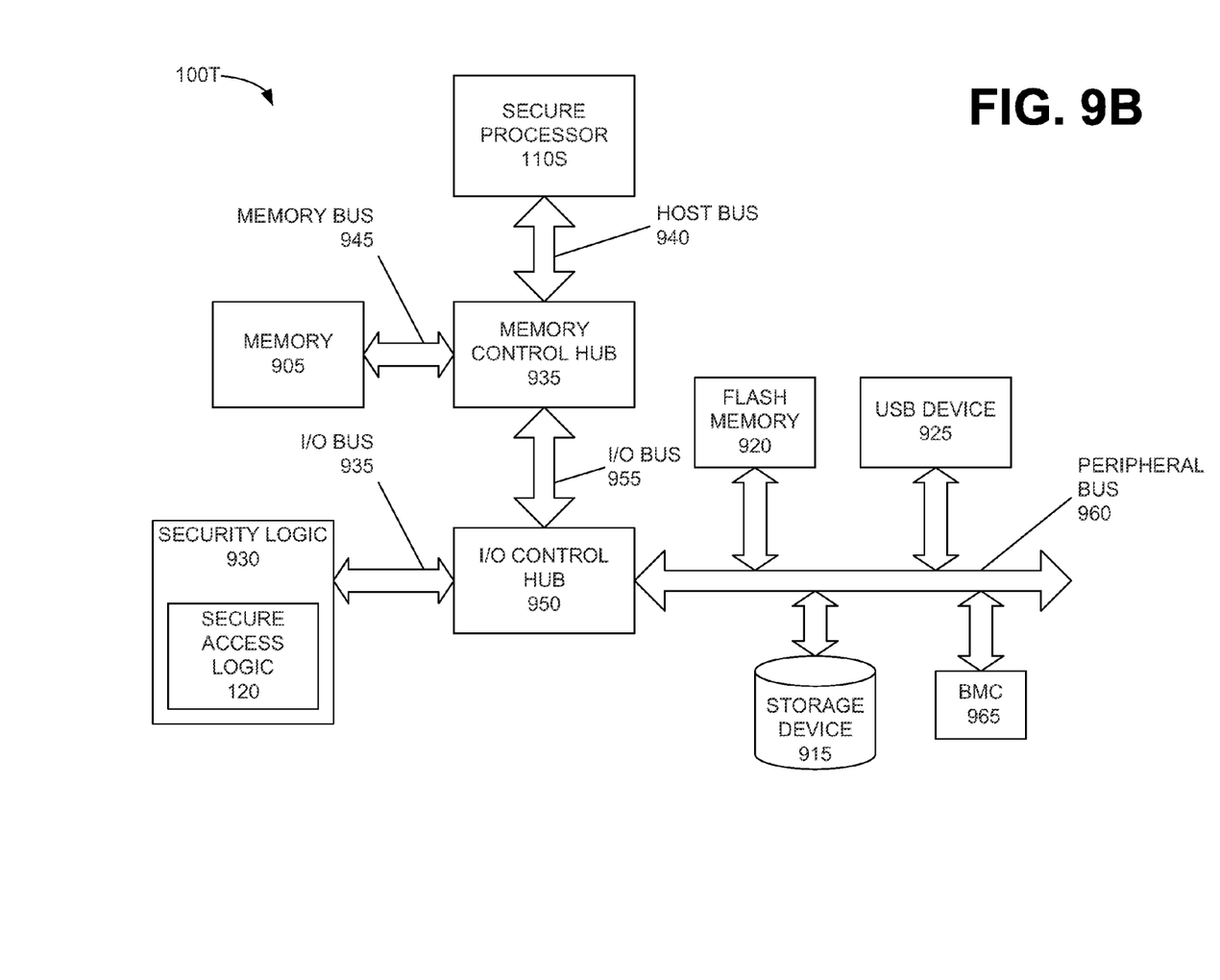
FIG. 9B is a block diagram showing further details of another computing device, in accordance with some embodiments of the invention as disclosed herein.

FIG. 9B is a block diagram showing selected components of another computing device in accordance with an embodiment of the invention as disclosed herein. Computing device 100T, sometimes referred to as a trusted computing device 100T, includes a secure processor 110S and security logic 930. Security logic 930, which is sometimes referred to as a trusted platform module, performs cryptographic functions and may be used to store cryptographic keys, digital certificates, and passwords. Security logic 930 also includes secure access logic 120, described above in connection with FIG. 1.

Secure processor 110S supports creation and management of multiple isolated execution environments, or partitions. Each of these isolated environments has dedicated resources (e.g., memory, processor state, etc.) that are managed by the processor, chipset, and OS kernel. In some embodiments, at least one of these partitions is a protected partition, where software can run in isolation, free from being observed or compromised by other software running on the platform.

In some embodiments of trusted computing device 100T, secure processor 110S communicates with a memory control hub 935 over a host bus 940. Memory control hub 935 in turn interfaces to system memory 905 over a memory bus 945, and to an input/output (I/O) control hub 950 over an I/O bus 955. In some embodiments, hubs 935 and 950 are known as "host bridges", and in particular, memory control hub 935 may be referred to as a "North bridge" and I/O control hub 950 as a "South bridge". I/O control hub 950 interfaces to various peripheral devices over a peripheral bus 960, as well as to a baseboard management controller 965.

The systems and methods describe herein (e.g., logic 200, logic 300, logic 700, process 600, etc.) can be implemented in software, hardware, or a combination thereof. In some embodiments, these systems and methods are implemented in hardware, including, but not limited to, a programmable logic device (PLD), programmable gate array (PGA), field programmable gate array (FPGA), an application-specific integrated circuit (ASIC), a system on chip (SoC), and a system in package (SiP). In some embodiments, the systems and methods disclosed herein are implemented in software that is stored in a memory and that is executed by a suitable processor (e.g., microprocessor, network processor, microcontroller, digital signal processor, digital signal controller, application-specific instruction set processor, etc.) situated in a computing device. This executable code can be embodied in any computer-readable medium for use by or in connection with a processor.

In the context of this disclosure, a "computer-readable medium" can be any means that can contain or store the program for use by, or in connection with, the processor. The computer readable medium can be, for example but not limited to, a medium that is based on magnetic, optical, electromagnetic, or semiconductor technology. Specific examples of a computer-readable medium using semiconductor technology would include (but are not limited to) the following: a random access memory (RAM); a read-only memory (ROM); an erasable programmable read-only memory (EPROM or Flash memory). A specific example using magnetic technology includes (but is not limited to) a computer disk or diskette. Specific examples using optical technology include (but are not limited to) a compact disk read-only memory (CD-ROM).

The flow charts herein provide examples of the operation of embodiments disclosed herein. Alternatively, these diagrams may be viewed as depicting actions of an example of a method implemented by logic 200, logic 300, and/or logic 700. Blocks in these diagrams represent procedures, functions, modules, or portions of code which include one or more executable instructions for implementing logical functions or steps in the process. Alternate embodiments are also included within the scope of the disclosure. In these alternate embodiments, functions may be executed out of order from that shown or discussed, including substantially concurrently or in reverse order, depending on the functionality involved. Not all steps are required in all embodiments.

What is claimed is:

1. A method comprising:
   responsive to a failure to clear a secure portion of a system resource, storing a power off time and performing a power off reset;
   responsive to the power off time being monitored, determining whether sufficient time has elapsed since the power off reset, based on a predetermined threshold;
   responsive to insufficient time having elapsed since the power of reset, perform another power off reset; and
   responsive to sufficient time having elapsed since power off reset, performing a normal hoot sequence.

2. The method of claim 1, further comprising:
   repeating successive power off reset cycles until sufficient time has elapsed since the power off time based on the predetermined threshold.

3. The method of claim 1, further comprising:
   detecting, through a system trap, the failure to clear a secure portion of the system resource.

4. The method of claim 1, wherein the system resource comprises a memory.

5. The method of claim 4, wherein the predetermined threshold is based on decay characteristics of the memory.

6. The method of claim 4, wherein the predetermined threshold is based on decay characteristics of the secure portion of the memory.

7. A method comprising:
   detecting a failure to clear a secure portion of a system resource in a device;
   responsive to the detection, powering off the system resource for a period of power-off time that is sufficient to clear data from the system resource; and
   responsive to the period of power-off time baying elapsed, unlocking the secure portion of the system resource,
   wherein the system resource comprises a memory, and
   wherein the period of power-off time is based on decay characteristics of the secure portion of the memory.

8. The method of claim 7, further comprising:
   detecting, through a system trap, the failure to clear a secure portion of the system resource.

9. The method of claim 7, further comprising:
   responsive to the power off, determining whether the period of power-off time is being.

10. A computer system comprising:
    a memory having a secure portion;
    a secure processor;
    detection logic configured to detect a failure to clear the secure portion of the memory;
    timed power off logic configured to power off the secure portion of the memory for a period of power-off time that is sufficient to clear data from the secure portion of the memory, responsive to the detection logic; and
    unlock logic configured to unlock the secure portion of the memory, responsive to the period of power-off time having elapsed.

11. The system of claim 10, wherein the time power off logic further comprises:

timer logic configured to start upon the power off and to expire when sufficient time has elapsed since the start, based on a predetermined threshold, wherein the unlock logic is responsive to the timer expiring.

12. The system of claim 10, wherein the period power-off is based on decay characteristics of the memory.

13. The system of claim 10, wherein the detection logic further comprises:

logic configured to detect the failure to clear the secure portion of the memory.

\* \* \* \* \*

UNITED STATES PATENT AND TRADEMARK OFFICE
CERTIFICATE OF CORRECTION

PATENT NO.        : 8,892,860 B2                                          Page 1 of 1
APPLICATION NO.   : 13/120653
DATED             : November 18, 2014
INVENTOR(S)       : Bernard D. Desselle et al.

It is certified that error appears in the above-identified patent and that said Letters Patent is hereby corrected as shown below:

In the Claims

In column 8, line 20, in Claim 1, delete "of" and insert -- off --, therefor.

In column 8, line 20, in Claim 1, delete "perform" and insert -- performing --, therefor.

In column 8, line 43, in Claim 7, delete "baying" and insert -- having --, therefor.

In column 8, line 53, in Claim 9, delete "being." and insert -- being monitored. --, therefor.

Signed and Sealed this
Seventh Day of April, 2015

Michelle K. Lee
*Director of the United States Patent and Trademark Office*